Sept. 17, 1968     R. ADELL     3,401,486

ORNAMENTAL AND PROTECTIVE MOLDING FOR MOTOR VEHICLE DOORS

Filed May 16, 1966

INVENTOR.
ROBERT ADELL

BY
Gregory S. Dolgoruleov

ATTORNEY

United States Patent Office 3,401,486
Patented Sept. 17, 1968

3,401,486
ORNAMENTAL AND PROTECTIVE MOLDING
FOR MOTOR VEHICLE DOORS
Robert Adell, Birmingham, Mich., assignor to U.S.
Products Development, Detroit, Mich., a Michigan
partnership
Filed May 16, 1966, Ser. No. 550,469
7 Claims. (Cl. 49—462)

ABSTRACT OF THE DISCLOSURE

A U-shaped molding having a longitudinal form corresponding to that of the trailing door edge extends thereover to ornament the edge and protect the finish on the trailing edge from being damaged when the door edge strikes an object when the door is opened.

Background of the invention

The ornamental protective molding of the present invention is similar to that to be found in applicant's patents 2,704,688; 2,896,998 and 2,929,656.

Summary of the invention

The molding of the present invention may be made of plastic or other materials but herein illustrated as being made of spring steel having a U-shaped cross section and a longitudinal form which corresponds to that of the trailing edge of the door. The frame of the door has an extending flange over which the outer skin is reversely bent to provide an inwardly directed flange which terminates short of the door frame wall. The edge of the flange may be irregular and spaced different amounts from the frame wall.

The molding has an inner and outer leg with an enlarged or reversely bent portion at one end with the opposite ends joined by a web herein illustrated as being of arcuate shape. The length of the web is such as to space the adjoining portion of the legs from the front skin portion and the reversed flanged portion thereof. The inner leg length is such as to have the reversely bent portion spaced from the edge of the inwardly flanged skin portion.

To provide assurance that the molding will be positively anchored on the trailing edge the molding is filled with a hardenable material either throughout the length of the strip or at spaced portions therein which will fill the space between the legs and the trailing edge. The material will extend between the reversely bent portion of the inner leg and the edge of the skin which is flanged over the flange of the door frame. When the material becomes hardened, the portion between the reversely bent end of the inner leg and the edge of the reversely bent skin flange will firmly secure the molding on the door trailing edge against movement. Some adhesive properties may be present in the hardenable material but an adhesive force is not relied upon for securing the strip in position since the anchoring of the material between the edge of the reversely bent end of the inner leg firmly secures the molding strip on the trailing edge of the door.

Figure 1:
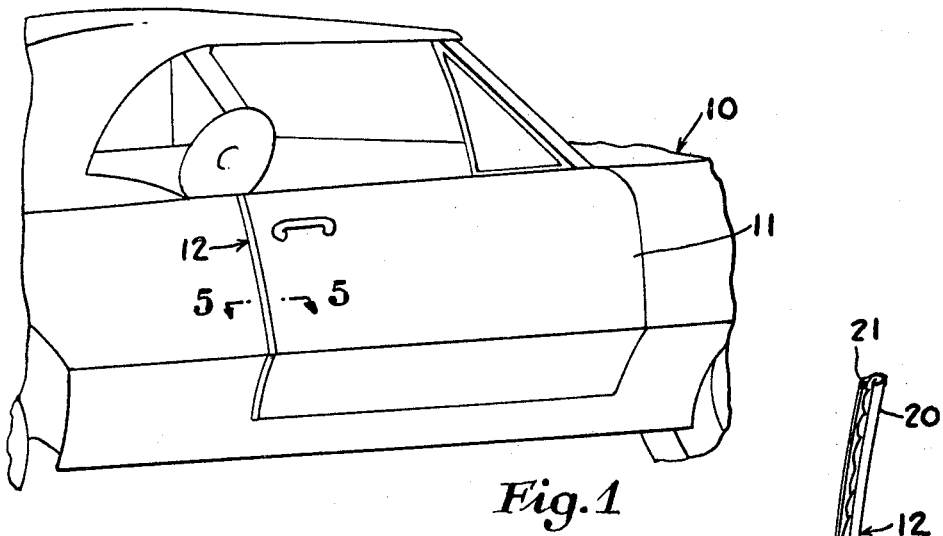
FIGURE 1 illustrates an automobile, the trailing edge of the door whereof is provided with a molding embodying the present invention.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

In the drawing there is shown, by way of example, an improved molding construction embodying the present invention and the method of application of the molding to the vehicle door to attain the desired results. Referring specifically to the drawing, the vehicle generally designated by the numeral 10 has a door 11, the trailing edge of which is provided with the ornamental and protective molding generally designated by the numeral 12. The trailing door edge to which the molding 12 has to be applied comprises an inner door sheet 15 bent to provide a flange 16, with the edge portion of the outer skin sheet 17 being bent or wrapped around the flange 16 to form flange 18. The extremity of said flange 17 designated by the numeral 19 is the edge over which the molding has to pass and to extend thereover in a manner described below.

The molding comprises a strip of resilient metal bent to form a channel of a substantially U-shape cross-section and having an outer leg 20, an inner leg 21, and a rounded web or connecting portion 22. The outer leg 20 has its end bent to form a curl 23 intended to protect the finish of the outer skin in application of the molding, while the inner leg 21 has a hook portion 24 provided thereon. The above description is made with respect to the cross-sectional configuration of the molding, and it will be understood that the elements appearing in cross-section as legs of the U actually are long flanges of that cross-section. The longitudinal configuration of the molding substantially corresponds to that of the trailing edge or a portion thereof which the molding is intended to cover.

In accordance with the invention, the inner leg 21 of the molding is made sufficiently long to go over or extend beyond the edge 19 of the flange 18 in the widest occurrence of said flange.

It will now be seen in view of the foregoing that after the molding 12 is applied over the trailing edge of the door, in the vast majority of cases there will be a substantial clearance space between the edge 19 and the hook portion 24 of the inner leg. The presence of such clearance space in prior constructions permitted free movement of the molding on the door edge for a distance determined by the extent of such clearance space. In cases where such clearance was sufficiently large, the molding could move on the door edge for that distance, which in some cases could be as much as ⅛ of an inch or even more. In consequence thereof the molding could move off the door edge for such distance and hit the door post in closing the door. This, in turn, could impose such strong impact force on the molding as to flex it and peel it off from the door edge. Such undesirable condition has been eliminated by the present invention. Prior to installation of the molding its interior is partly filled, thoughout its entire length or in spots, with a filler cement substance, which hardens after application but which has paste-like consistency prior to its hardening or drying. Such substances generally include a filler such, as a powdered mineral or metal filings, and a suitable binder which hardens or dries upon application. Many such substances are known and are available under the general designations such as "liquid aluminum," "liquid steel," "plastic wood," and the like.

Figure 3:
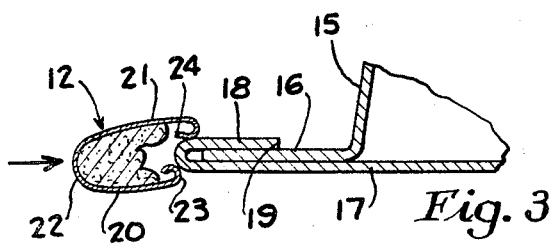
FIG. 3 is a sectional view illustrating application of a molding to the door edge.
Figure 4:
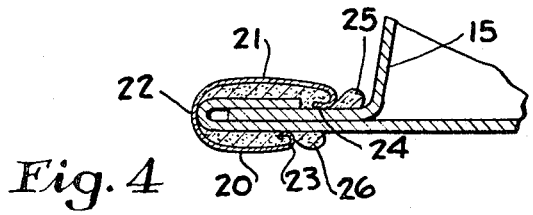
FIG. 4 is a sectional view illustrating the condition of the molding immediately upon its application to the door and indicating the excesses of the filler substance squeezed out from the molding in application thereof.
Figure 2:
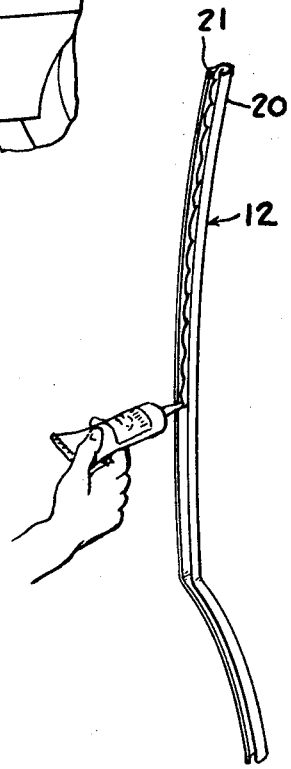
FIG. 2 illustrates application of hardening filler cement, in the plastic stage thereof, to the molding immediately prior to its installation.
Figure 5:
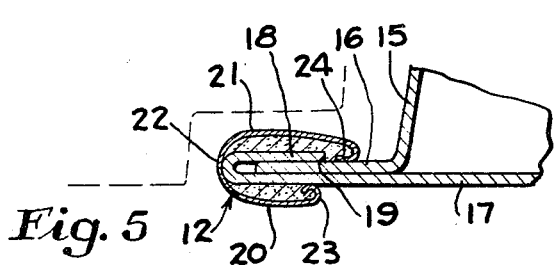
FIG. 5 is a sectional view taken in the direction of the arrows on the section plane passing though the section line 5—5 of FIG. 4 and showing the molding with the excess of the filler cement being wiped off.

After being filled with such a substance, the molding is applied to the door edge as illustrated in FIG. 3. In the process of such application the trailing edge of the door displaces some of the plastic substance, causing it to run longitudinally of the molding with the excess thereof coming out from the ends of the molding as well as from under its curled edges illustrated in FIG. 4. The molding is pushed all the way on the door edge until the rounded portion 22 comes in direct contact with the extremity of the trailing edge. Thereupon the excess of the plastic substance, such as illustrated in FIG. 4 at 25 and 26, is removed preferably with a rubber putty knife or a similar tool and wiped clean with a rag, using suitable solvent, if desired, until all traces of such substance are removed. Thereupon the assembly is permitted to dry until the plastic substance becomes thoroughly hard.

It will now be seen that upon drying all the clearing spaces between the trailing edge of the door and the parts of the molding are filled with a hard substance, irrespective of the extent of such clearance spaces and variations thereof caused by manufacturing differences. The molding so assembled is retained in place in a substantially positive manner and cannot be removed or moved outwardly by itself. The action of the filler cement is twofold—it fills the interior of the molding and may have some adhesive function. However, compositions having only filling effect or only adhesive effect may also be used under some conditions. However should removal of such molding be desired under some special circumstances, this can be done by prying the edges of the molding with a screw driver or a similar tool in the direction normal to the surfaces of the door edge thus breaking the bond and the hardened substance itself. Upon manipulation of such molding, it can be taken off the door edge.

It will be understood however that the above-disclosed construction and method are preferred when installation of the molding is intended to be permanent. Such installation may be applied to original equipment, such as during final assembly of the automobile body, or at any time during the life of the vehicle. It can be seen that the method of the application of the molding is so simple as to be easily practiced by almost any owner of the automobile.

While the above-described construction and method have been described with respect to molding made of resilient sheet metal, such as steel, it will be understood that a molding made of other materials which may be resilient or non-resilient may also be used with success, and in some conditions with added advantages. A molding made of plastic material, either by the extrusion or by the molding process, may have particular advantages. Such molding may be metalized, that is metal plated, either in silver or in gold color, and mounted over the trailing edge with the filler substance possessing sufficient adhesive properties. Upon hardening, such filler substance enables the molding to maintain its rounded shape, while adhesive properties of the filler substance would provide sufficient bond to retain the molding on the door edge permanently. Such molding may also be made of a color harmonized in a desirable manner or made identical with the general color of the automobile body.

It may be desirable to have the filler substance to be of a rubber-like material in order to provide a cushion on the trailing edge and prevent crumbling out of the filler substance where the plastic molding may be under impact forces. It will be understood that such molding would also have an important advantage of eliminating damage to adjacent cars by opening doors. The outer skin of automobiles, even those having protective moldings on their doors is often damaged by the opening doors of the cars parked adjacent thereto.

An additional advantage of my improved molding installed as described above, but irrespective of whether it be made of metal or out of other materials, is found in elimination of any rusting of the trailing door edge by sealingly covering the same and thus providing increased protective function. When made of plastic material the molding may have the ends of their legs provided with thickened edges rather than hooked or curled portions.

I claim:

1. In an automobile body including a door having a trailing edge formed by bending an inner door sheet to form an edge flange and wrapping an outer skin edge around said inner door flange, an ornamental and protective molding for said trailing edge, said molding comprising a strip of material having a U-shape cross-section and thus adapted to embrace said trailing edge and to cover the same with the longitudinal configuration of the molding corresponding to that of the portion of the trailing edge which the molding is to cover, said molding including in its cross-sectional configuration an outer leg engaging the outer surface of the trailing edge, and an inner leg engaging the inner surface of the trailing edge and fully covering the flange formed by the portion of the outer skin sheet bent over the edge of the inner door sheet, said legs being connected by a web which spaces them from said trailing edge, and a hard material filling the spaces between the legs and the trailing edge at least at spaced portions therealong and engaging the edge of the outer skin flange to positively anchor the molding on the trailing door edge.

2. The construction defined in claim 1, with the molding being made of resilient metal, and the end of the inner leg being bent to provide a hook portion engaged by the material outwardly of the outer skin edge.

3. The construction defined in claim 1, wherein the hardenable material extends substantially the entire length of the molding engaged by the material outwardly of the outer skin edge.

4. The construction defined in claim 1, wherein the web of the molding is in contact with the extremity of the trailing edge.

5. The construction defined in claim 1, wherein the molding is made of resilient sheet metal.

6. The construction defined in claim 1, wherein the molding is made of a plastic material having an inturned hook on the inner end of the inner leg which receives said hard material and anchors said leg on the trailing edge.

7. A method of installing an ornamental and protective molding on the trailing edge of a motor vehicle door, with said edge including on its inner surface a flange formed by bending over the edge of the outer skin sheet, said method comprising providing a molding of a U-shape cross-section having an outer leg, an inner leg and a rounded connected portion, with the inner leg having its end bent to provide a hook portion extending over the edge of said flange, filling the molding with a plastic, hardenable material and forcing the molding on the door edge to have the material disposed between the edge of the flange and the hook portion of the inner leg which when hardened positively anchors the molding to the trailing door edge.

References Cited

UNITED STATES PATENTS

| | | | |
|---|---|---|---|
| 1,805,584 | 5/1931 | Kemp | 49—462 X |
| 2,166,798 | 7/1939 | Cote | 52—627 |
| 2,226,615 | 12/1940 | Killen | 49—462 |
| 2,704,688 | 3/1955 | Adell | 49—462 |
| 2,733,097 | 1/1956 | Stevens | 49—462 |
| 2,896,998 | 7/1959 | Adell | 49—462 |
| 2,929,656 | 3/1960 | Adell | 49—462 |

DAVID J. WILLIAMOWSKY, *Primary Examiner.*

P. C. KANNAN, *Assistant Examiner.*